Sept. 15, 1959   B. F. WILEY   2,904,112
APPARATUS FOR DETECTING LEAKS FROM WELL BORES
Filed Jan. 14, 1955   3 Sheets-Sheet 1
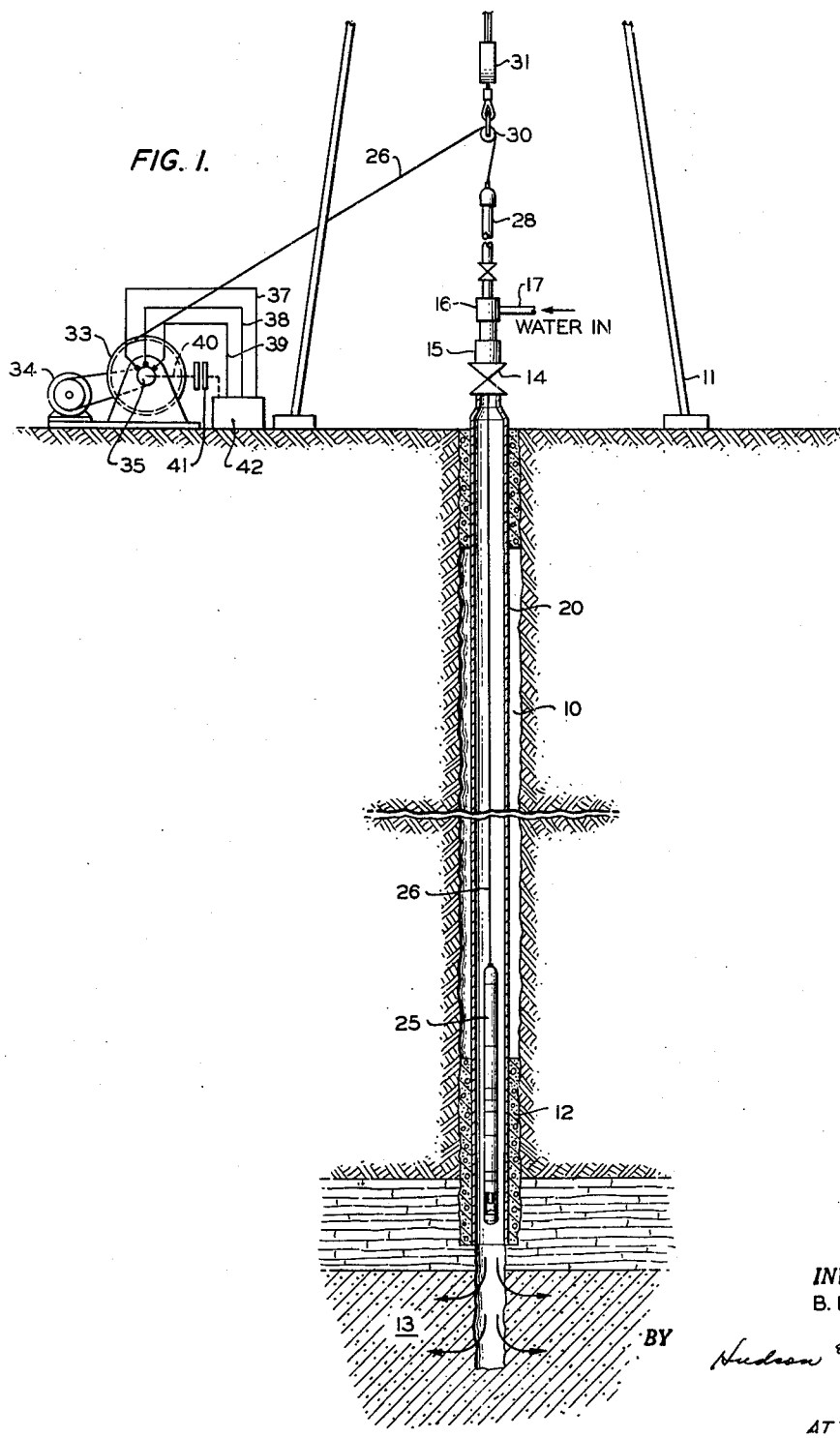
INVENTOR.
B. F. WILEY

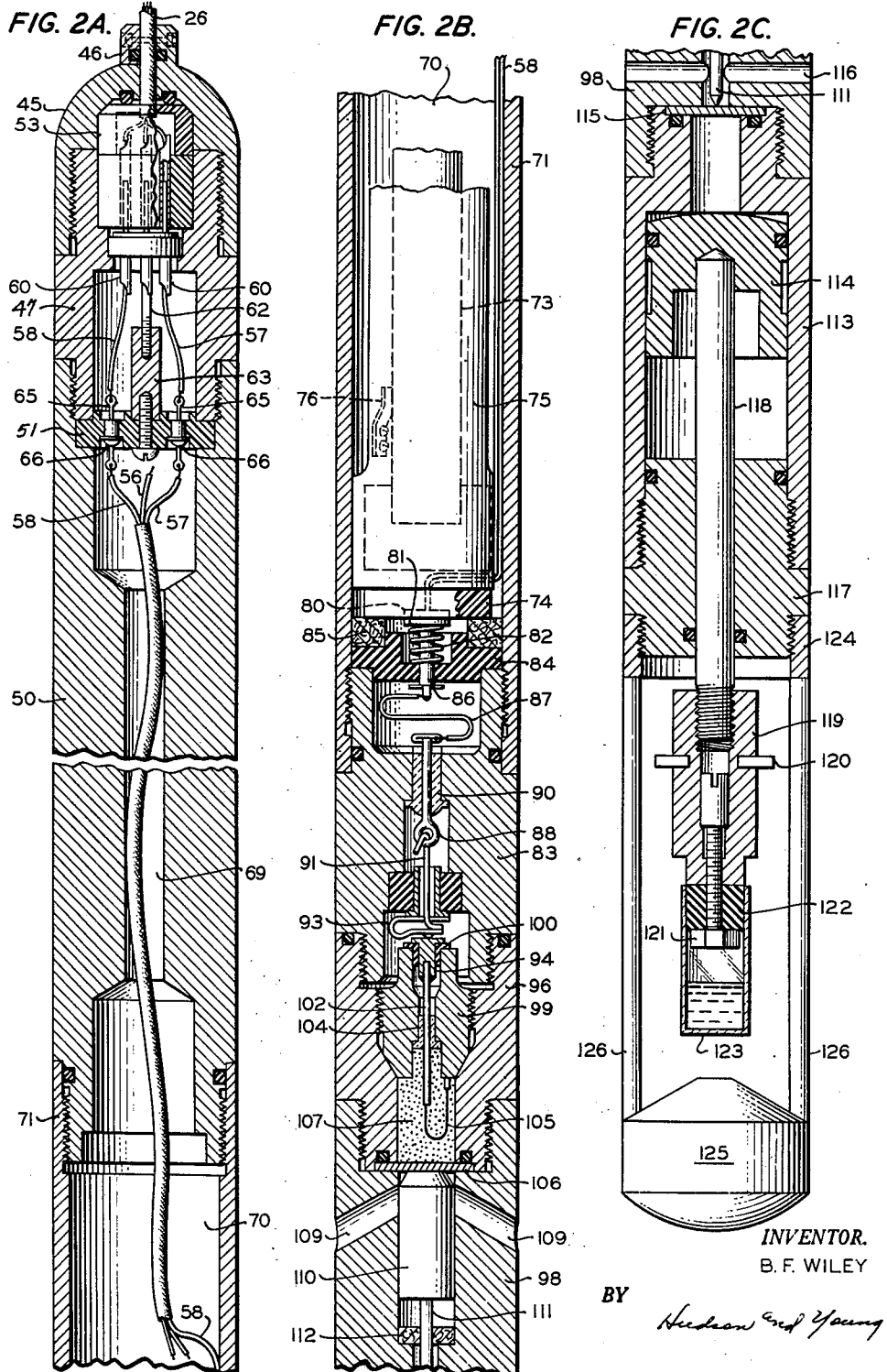

INVENTOR.
B. F. WILEY
BY
Hudson and Young
ATTORNEYS

United States Patent Office 2,904,112
Patented Sept. 15, 1959

2,904,112

APPARATUS FOR DETECTING LEAKS FROM WELL BORES

Bruce F. Wiley, Bartlesville, Okla., assignor to Phillips Petroleum Company, a corporation of Delaware Application January 14, 1955, Serial No. 481,949

12 Claims. (Cl. 166—63)

This invention relates to a method of and apparatus for detecting fluid leaks from well bore holes into surrounding formations. In one aspect this invention relates to a method for detecting leaks of well fluid through the casing of a well bore hole and/or through the cement footing of said casing. In another aspect this invention relates to improved means for adding a tracer element to a well fluid.

When the natural energy latent within an oil-producing formation approaches exhaustion the amount of oil flowing through the formation to the oil well decreases to the point where operation of the well is not economically feasible. Yet in many instances the oil-producing formation may contain upwards of 75 percent of its original oil content. In order to obtain better recovery of oil in such instances oil producers have developed methods of applying artificially developed energy to partially depleted oil producing formations. Such methods are known in the oil industry as secondary recovery.

Several of these secondary recovery methods have been developed. Fluid injection methods wherein a fluid, either a gas or a liquid, is injected into the oil-producing formation are being increasingly employed and have become an important part of oil-producing operations. Fluid injection methods include those commonly referred to as "pressure restoration," "pressure maintenance" and "gas drive," in all of which a gas is usually injected, and "water flooding" in which water is injected into the oil-producing formation. In fluid injection processes, and particularly in water flooding operations, the fluid is usually injected into the formation through what is called an "injection well" and the oil is produced through a different well or wells.

One of the problems frequently encountered in fluid injection operations, such as water flooding, is loss of the injection fluid into formations other than the oil producing formation which it is desired to flood. Leaks of said injection fluid can occur through the injection well casing but more frequently occur through the cement footing in which the casing is set. When such leaks occur the fluid usually travels up behind the casing, i.e., between the casing and the wall of the well bore because this is generally the path of least resistance. For the proper operation of a water flooding project it is important and highly desirable to be able to readily detect and locate such leaks.

Accordingly, it is an object of this invention to provide a method of detecting and locating leaks of well fluid from a bore hole.

Another object of the invention is to provide a method of detecting and locating leaks of injection fluid from a well bore, either through the casing or through the cement footing of said casing, while said fluid is being pumped through said well bore into an oil producing formation.

Another object of the invention is to provide an improved apparatus for adding a tracer material to the well fluid by means of hydrostatic pressure.

Still another object of the invention is to provide an improved apparatus for releasing a radioactive tracer material into a well fluid in a manner so as to not contaminate, for any appreciable length of time, the wall of said well.

Further aspects, objects and advantages of the invention will be apparent to those skilled in the art upon reading this disclosure.

Thus according to the invention there is provided a method for detecting leaks from well bores having a casing positioned therein and wherein a fluid is being returned to a formation penetrated by said well bore which comprises: adding a quantity of radioactive tracer material to said fluid; forcing said fluid containing the radioactive tracer material from said well bore into said formation and concomitantly through any leak in said casing or the footing in which said casing is mounted; making at least one radioactivity log of said well bore; and determining from said log or logs the extent and location of any leak in said casing or said footing.

In some instances where the natural radioactivity of the formations penetrated by the well bore is high it will be necessary to make a first radioactivity log of the well bore prior to adding the radioactive material to the well fluid. Then a second log is made after the addition of the radioactive material. Since fluid leaking through the casing, or the casing footing, usually travels between the casing and the well bore wall, the presence of radioactive material which did not enter the production formation with the main body of fluid can be readily detected with a suitable radiation detector. A comparison of the two logs will show the increase in radioactivity due to the presence of the added radioactive material in the leaked fluid.

Further according to the invention there is provided an apparatus for releasing a tracer material into a fluid, which comprises: a cylinder closed at one end with a frangible diaphragm and closed at the other end with a closure member, the pressure on the exterior of said diaphragm being substantially greater than the pressure within said cylinder; a piston within said cylinder; a frangible container mounted on one end of a rod operatively connected to said piston at its other end; a striking surface supported in close proximity to said container; and means for fracturing said diaphragm thereby causing said container to strike said surface, fracture, and release said tracer material.

In a presently preferred embodiment adapted to be employed in well bore holes the differential between the pressure within the cylinder and the pressure of the bore hole fluids actuates the piston. Thus the means for actuating said piston comprises a charge of gunpowder, which when ignited drives a punch through the frangible diaphragm sealing one end of said cylinder, thus permitting well fluids at relatively high pressure to enter said cylinder and actuate said piston so as to drive the frangible container against the striking surface.

It is to be noted that the gunpowder charge is positioned completely apart from the tracer material. This feature of the invention represents a distinct advantage over prior art devices wherein the force of the exploding gunpowder is applied directly to the container to eject the tracer material with great force. This is particularly true when radioactive tracer materials are employed in well bores because it has been found that the radioactive tracer is sometimes ejected with such force as to cause contamination of the well bore wall at the point of ejection, thus blanketing out any detection of the tracer at that point.

Figure 1 is a diagrammatic illustration of an injection well with the combined leak detector and tracer ejector of the invention suspended within the well.

Figures 2a, 2b and 2c illustrate in detail one embodiment of the combined leak detector and tracer ejector suspended in the well of Figure 1.

Figure 4:
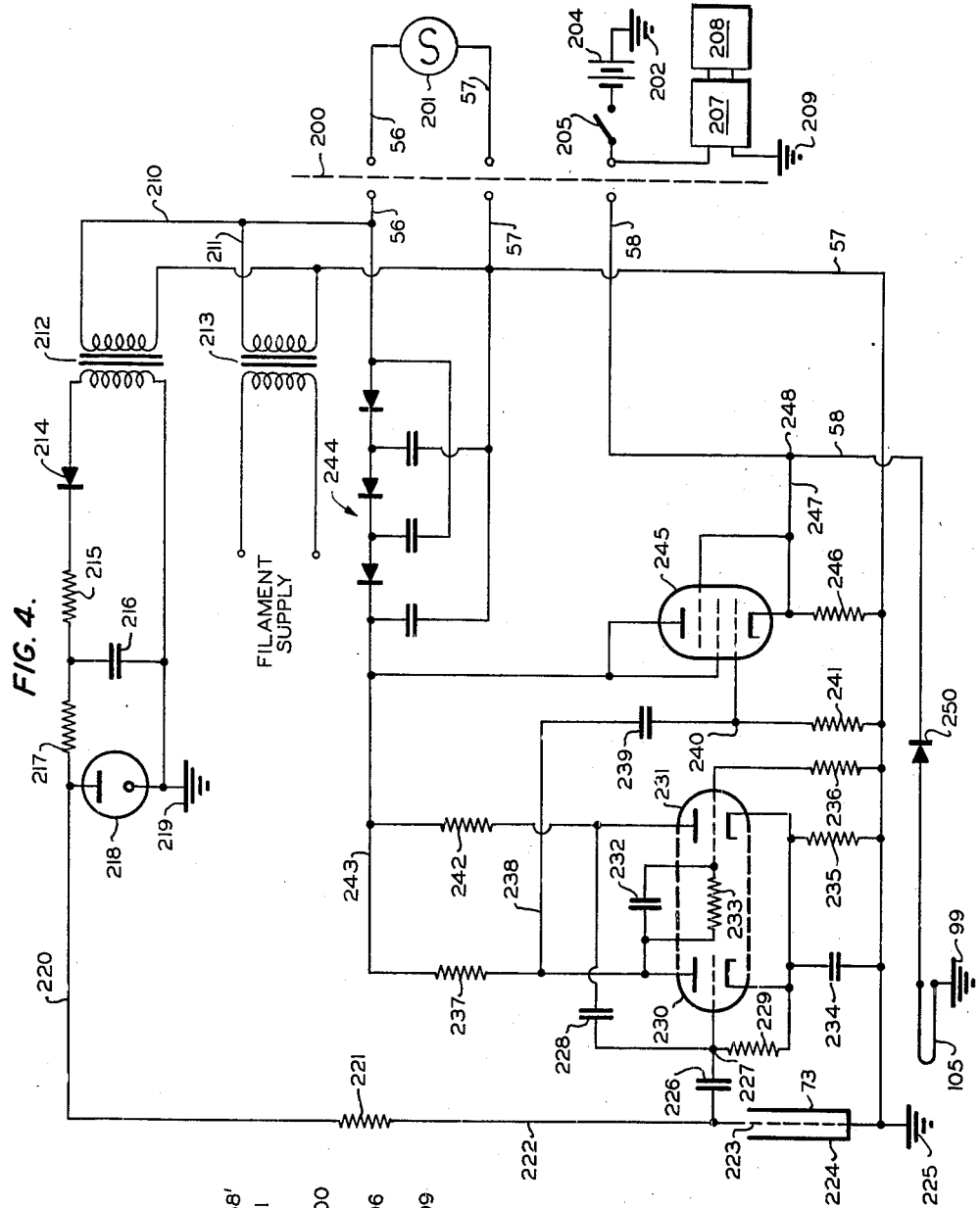
Figure 4 is a schematic diagram of a circuit which can be employed with the apparatus of Figures 2a, 2b and 2c.

Referring to the drawings and to Figure 1 in particular the invention will be more fully explained. In the drawings corresponding reference numerals are employed to denote corresponding elements where possible. In Figure 1 there is illustrated an injection well or bore hole 10 having a derrick structure 11 positioned over the well at the surface. Said bore hole is cased with a casing 20 set in a cement footing 12. Reference numeral 13 denotes an oil producing formation which it is desired to flood with water. A leak detector and tracer ejector assembly 25, constructed according to the invention, is suspended within casing 20 by means of armored cable 26. This assembly, which is illustrated in greater detail in Figures 2a, 2b and 2c, contains a quantity of radioactive material to be released into the injection fluid and a suitable radiation detector. The upper end of cable 26 extends through a lubricator joint 28 attached to T member 16 such that assembly 25 can be inserted through member 15 and valve 14 into casing 20. Cable 26 extends upward over a pulley 30, which is supported by a crane 31, and thence to a rotatable reel 33. Reel 33 is driven by a motor 34 such that assembly 25 can be raised and lowered into the bore hole to known depths. Armored cable 26 contains three electrical leads which terminate in respective slip rings mounted on the drive shaft 35 of reel 33. Electrical leads 37, 38 and 39 are attached to respective individual brushes which in turn engage the respective individual slip rings on shaft 35. These various leads extend to the surface indicating apparatus shown at 42. Mechanical linkage 40 having clutch 41 therein is connected to a recorder included within the surface indicating apparatus 42 so as to record the depth of assembly 25 in the bore hole. Injection water is introduced through inlet 17.

In Figures 2a and 2b there are illustrated structural details of the assembly 25. Cable 26 is attached to a cap 45 by means of a conventional cable coupling 46. A nipple 47 is threaded to the lower end of cap 45 and a sinker bar 50 is threaded to the lower end of nipple 47. An insulating bushing 53 lines the interior of cap 45 and the upper region of nipple 47. Three electrical leads 56, 57, and 58, contained within cable 26, pass through individual headers 60 which communicate between the interior of bushing 53 and the interior of nipple 47. An insulating disk 51 is interposed between nipple 47 and sinker bar 50. This disk is secured to nipple 47 by a rod 62 and a coupling 63 which extend therebetween. The various leads 56–58 pass between nipple 47 and sinker bar 50 by means of connecting terminals 65 mounted within insulating plugs 66. Electrical leads 56–58 then pass downward through the interior passage 69 of sinker bar 50 and thence into the interior 70 of a casing section 71 which is threaded to the lower end of sinker bar 50.

The upper region of chamber 70 is filled with the various electrical circuit components which are described hereinafter in conjunction with Figure 4. A Geiger tube 73 is mounted in the lower region of chamber 70 by a pair of mounting brackets, one of which is illustrated at 74. A cartridge 75 having a plurality of elongated slots therein encloses Geiger tube 73 and provides a rigid support therefor. A contact spring 76 is attached to cartridge 75 and engages the shell of tube 73 to provide a grounded connection. Electrical lead 58 passes through chamber 70 adjacent Geiger tube 73 and is connected at its lower end to a first contact button 80 which normally is in engagement with a second contact button 81, the latter being retained against the former by a compression spring 82. A hollow plug 83 is threaded to the lower section of casing 71 and a circular plate 84 rests thereon. A ring of cushioning material 85 is interposed between plate 84 and bracket 74. A rod 86 is attached at its upper end to contact button 81 and at its lower end to a flexible connecting cable 87. The lower end of cable 87 is attached to a terminal 88 which passes through an insulating bushing 90 mounted within plug 83. The lower end of terminal 88 is connected to a cable 91 which in turn is attached to a flexible spring contact 93, the latter engaging a contact button 94. A breech block 96 is threaded to the lower end of plug 83 and a barrel 98 is threaded to the lower end of breech block 96. A plug 99 is threaded to the interior of breech block 96 and in turn supports contact button 94 by means of an insulating bushing 100. A terminal 102 is attached to the lower end of contact button 94 and extends downwardly through the interior of plug 99 and through an insulating bushing 104. A coil of firing wire 105 is connected between the lower end of terminal 102 and plug 99, the latter constituting a ground connection. A diaphragm 106 is interposed between breech block 96 and barrel 98 so as to form a fluid tight chamber which is filled with gun powder 107.

Barrel 98 is constructed with a plurality of vents 109 for venting to the well bore the gases resulting from the burning of powder charge 107. Positioned within barrel 98 is a plunger 110 having a punch 111 attached to the bottom thereof. A ring of cushioning material 112 is positioned below the bottom shoulder of plunger 110. A cylinder block 113, containing a piston 114, is threaded to the bottom of barrel 98. A diaphragm 115 is interposed between barrel 98 and cylinder block 113 and forms a fluid tight seal preventing entry of well fluids through inlet ports 116 into cylinder block 113 and above piston 114 until said diaphragm is ruptured by punch 111 as described below. A closure member 117 is threaded into the bottom of cylinder block 113. A piston rod 118 is attached to the bottom of piston 114 and extends through said closure member 117.

Threaded to the lower end of piston rod 118 is an adapter 119, equipped with wrench lugs 120, and having a recessed lower end which is threaded internally. A threaded bolt 121 extends into the lower end of adapter 119. Interposed between the head of bolt 121 and the recessed lower end of adapter 119 and mounted around said bolt is a resilient packing member 122. Resilient packing member 122 is generally made of a suitable type of rubber but other resilient materials can be employed. As bolt 121 is screwed into adapter 119, packing member 122 expands and thus forms a closure for frangible vial 123 which is pushed onto said packing member and extends over the recessed lower end of adapter 119. Vial 123 is preferably made of glass but other frangible materials such as a brittle plastic or a frangible metal can be used. Prior to being positioned on packing member 122, vial 123 is only partially filled with a quantity of the radioactive tracer material to be released into the well fluid as described below. A cage assembly comprising an upper ring member 124, a lower anvil member or striking surface 125 and a plurality of guard rods 126 mounted between said ring member and said anvil member is threaded to the lower end of closure member 117 and protects adapter 119 and vial 123 while the entire assembly is being lowered into the well bore.

Figure 3:
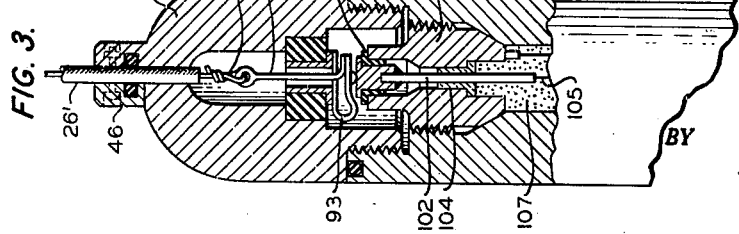
Figure 3 illustrates in detail one embodiment of the tracer ejector of the invention.

Figure 3 illustrates structural details of one embodiment of the tracer ejector per se of the invention. Cable 26' is attached to a cap 150 by means of a conventional cable coupling 46. Lead 58' contained within cable 26' is connected to cable 91 which in turn is connected to spring contact 93, the latter engaging contact button 94 as in Figure 2c. As shown, the threads of cap 150 engage threads of breech block 96. The remainder of said ejector, shown in elevation, is like the lower portion of Figure 2c previously described. It is to be noted that cap 150 fits directly onto breech block 96. Thus if one desires to employ the tracer ejector separately from the detector, cap 150 provides a convenient means for doing so. Chamber 70 of the detector can be closed with a suitable bottom closure.

Figure 4 shows a circuit for carrying out the invention described in Figures 1, 2, and 3. In Figure 4 dotted line 200 divides the circuit into components which are positioned at the surface, shown to the right of said line, and those components positioned within assembly 25, shown to the left of said line. The uphole or surface section includes a power source 201 of 54 volts at 400 cycles per second A.C. The power from source 201 is supplied over leads 56 and 57, the latter being grounded at 225. Filter 207 and counter 208 are shown on the uphole or surface side of line 200. The input to filter 207 is over lead 58. Filter 207 is grounded at 209. Battery 204, grounded at 202, is connected through switch 205 to lead 58 for use in firing the powder charge 107 described above. In this circuit lead 58 serves two purposes, (1) to supply the energy to ignite the powder charge 107 downhole and (2) transmit the amplified signals from Geiger tube 73 up the hole to filter 207 and counter 208.

The power from A.C. source 201 is supplied over leads 56, 210, 211, and 57 to the primary winding of transformer 213. The secondary of transformer 213 is connected to the filaments of vacuum tubes 230, 231 and 245; as will be understood by those skilled in the art said filaments are not shown for simplification purposes. In addition, power is also supplied from A.C. source 201 to the primary of transformer 212 via leads 56, 210 and 57. The output from the secondary of transformer 212 is applied to a rectifier 214, and a filter made up of resistances 215 and 217, the junction between the two resistances being connected to ground through condenser 216. Voltage regulator tube 218 is connected between resistances 217 and lead 220 and is grounded at 219. The output from this high voltage power supply is supplied over lead 220, resistance 221 and lead 222 to the anode 223 of Geiger tube 73. The cathode 224 of Geiger tube 73 is grounded at 225.

A.C. power source 201 also supplies power to voltage tripling circuit 244 made up of three rectifiers and three condensers. The output from this D.C. power supply is used as the high voltage B plus source for the anodes of vacuum tubes 230, 231 and 245. The anodes of vacuum tubes 230 and 231 are connected through resistances 237 and 242, respectively, to positive power lead 243 which is connected to tripling circuit 244.

When radiation is detected by Geiger tube 73, negative pulses are supplied to the grid of triode 230 through condenser 226 and terminal 227. Terminal 227 is connected by means of resistor 229 to the cathodes of tubes 230 and 231 which are in turn connected to ground by means of resistor 235 shunted by condenser 234. Vacuum tubes 230 and 231 form a single shot multivibrator circuit and the pulses supplied to the grid of tube 230 which is normally conducting, to cause this tube to stop conducting thus building up a high positive potential at its anode. Said high positive potential pulse is delayed when passing to the grid of 231 by means of the RC circuit made up of resistor 233 and condenser 232. When the delayed pulse reaches the grid of triode 231 which is positively biased by grounded resistor 236, it conducts, lowering the potential on the anode of said triode 231. This lowered potential is transferred by means of condenser 228 back to terminal 227 and the grid of 230 as the pulse originally triggering tube 230 stops and goes towards zero potential said tube 230 is made conducting and the multivibrator circuit restored to a non-active condition. This operation in the multivibrator fixes the length of the pulse which is supplied to the grid of pentode 245 from the anode of triode 230 over lead 238, condenser 239 and terminal 240 which is grounded through resistance 241. Pentode 245 serves as a power tube for boosting the pulse energy for transmission to the surface and its anode and screen grid are directly connected to the positive power supply formed by the voltage tripling circuit 244. The suppressor grid and the cathode of pentode 245 are connected together and grounded by means of resistor 246. The output of pentode 245 is taken at a point between its cathode and its grounded resistor 246 over lead 247, contact 248 and transmitted uphole via lead 58. Pentode 245 is connected as a cathode follower. Lead 58, as mentioned before, is connected to filter 207 and counter 208 which are located at the surface and may be used for indicating or recording.

When this instrument is placed in use in accordance with this invention, it is necessary that the radioactive materials be deposited in the well fluids. This is accomplished by closing the switch 205 momentarily which transfers a negative pulse over lead 58, contact 248, rectifier 250, and heating element 105 to ground 99. The negative pulse heats element 105 which ignites powder charge 107. During this interval output pulses from pentode 245 cannot be transmitted to the surface but this does not offer any particular disadvantage since it is only a momentary operation and occurs before any radioactive material has been released in the well bore. Rectifier 250 serves also to block positive pulses of electrical energy from pentode 245 from being short circuited to ground during operation of the Geiger counter, therefore, the output from pentode 245 is directed upward via lead 247, contact 248, and lead 58 to filter 207.

In operation, the presence of a leak in the casing and/or cement footing of said casing in a water injection well may be indicated by a decrease in pressure or an increase in the amount of water required to maintain a certain pressure, a decrease in oil produced from a production well, an unexpected increase or appearance of water in the oil produced from a production well, etc. Whenever a leak is suspected or known to exist assembly 25 is lowered into the bore hole within the casing until it is positioned at approximately the bottom of the hole as shown in Figure 1. At this time switch 205 is closed to fire powder charge 107 causing rupture of diaphragm 115 by punch 111 and permitting well fluid to enter the cylinder and actuate piston 114. Gases from the burning gunpowder are vented to the well bore through vents 109. Vial 123 is forced against striking surface 125, fractured, and the radioactive tracer material is released as a "cloud" into the injection water. Pumping of injection water into the well bore is continued such that the tracer material is entrained in the water and the greater part of said water is carried out the bottom of the well bore into the formation being flooded. If a leak exists a portion of the tracer containing water will concomitantly be forced through said leak. Since the water passing through a leak in the cement footing of the casing will usually travel upward behind the casing the presence of the radioactive material is readily detected by the radiation detector in assembly 25.

It is more common, generally speaking, for leaks to occur in the cement footing of the casing than in the casing itself. For this reason assembly 25 in Figure 1 is shown near the bottom of the well bore. As the tracer containing water travels upwardly it will penetrate the traversed formations in accordance with their permeability and the signals obtained by counter 208 will gradually diminish in rate. Thus the presence of a high counting rate (stronger than any which might be due to natural radioactivity) when assembly 25 is in the downhole position shown in Figure 1 shows a leak in the cement footing of the casing. The extent or magnitude of the leak is indicated by the output of the counter 208.

When it is suspected there may be a leak in the casing, assembly 25 is suspended at substantially the top of the well bore. The radioactive tracer material is released into the water and assembly 25 is lowered by reel 33 at a rate approximately equal to the downward velocity of the water. The tracer material travels downward with the water and a portion of the tracer material will be forced through any leak which it passes. Geiger tube 73, following behind will detect any such leak at the point of the leak and transmit the increased signal (over any natural radioactivity which may be present) to counter 208.

As mentioned it may be necessary in some instances to run a radioactivity log i.e., measure the variation with depth of the radioactivity, on the bore hole prior to making tests for leaks. In such cases a comparison between the logs will show the presence of a leak by the increase in radioactivity over that naturally present.

The location of a leak, in terms of depth, can be determined by means of the recording depth meter included in the surface equipment 42 and driven from reel 33 by means of linkage 40. Thus the position of assembly 25 in the bore hole is known at all times. Such equipment is well known and understood by those skilled in the art.

In some injection wells, where the casing of the well is not in good condition, a tubing with a packer at the lower end thereof is installed within the casing and the injection fluid is pumped through the tubing. In such instances most leaks which occur will occur in the cement footing of the casing or in the said packer. Such leaks can be detected by lowering assembly 25 through said tubing to the downhole position and proceeding as described above.

The complete separation of the gunpowder charge from the tracer material container has been discussed. This feature of the invention together with the manner of attaching vial 123 to piston rod 118 imparts a further advantage in that the tracer material can be released from its container quickly, but smoothly as a substantially compact cloud, i.e., a region of high tracer material concentration, into the injection fluid. Assembly 25 is of course assembled at the surface. Therefore the pressure in cylinder 113 and in the space above the tracer material in vial 123 is substantially atmospheric. As assembly 25 is lowered into the bore hole the increase in pressure outside vial 123 forces said vial farther onto packing member 122 until the pressure within said vial is substantially the same as the pressure of the well fluids outside said vial. Thus when the vial is fractured the tracer material is released, rather than discharged or ejected, from a containing zone at a given pressure into the injection fluid which is under substantially the same pressure. The substantially compact region of high tracer material concentration thus formed travels as such, at least until it reaches the formation to be flooded, and is more effective in detecting leaks than the much more dispersed tracer material which results from the violent ejection and agitation produced by the direct explosive methods of the prior art.

Any suitable radioactive tracer material can be used according to the method and in the apparatus of the invention. However, gamma radiation materials are preferred because the gamma rays are more penetrating and thus more easily detected through the casing. Suitable materials are radium, radon, potassium thorium, and radioactive isotopes of iodine, chlorine, argon, etc. Radioactive ores such as carnotite can be used. The tracer material is preferably dissolved in a liquid which will mix readily with the injection fluid when said fluid is a liquid. When the injection fluid is a gas a gaseous tracer material is preferred. If desired the tracer material can be in the form of a suspension within the liquid in the vial.

Throughout the above description reference has been made to using a Geiger tube as the radiation detector. It should be understood that the invention is not so limited. Other radiation detectors such as an ionization guage or a scintillation counter can be employed.

Also, while the invention has been described as applied to secondary recovery methods, and particularly to water flooding, it should be understood that the invention is also applicable to those secondary recovery methods wherein the injection fluid is a gas. The invention can also be employed to determine regions of lost circulation of drilling muds and in radioactive logging of well bores for permeability studies.

Although the invention has been described as applied to an injection well wherein the injection fluid is returned to a formation at the bottom of a drill hole the invention is also applicable to those wells completed by perforating the casing adjacent a higher formation.

As will be evident to those skilled in the art, various modifications of this invention can be made, or followed, in the light of the foregoing disclosure and discussion, without departing from the spirit or scope of the claims.

I claim:

1. Apparatus for releasing a tracer material into a fluid which comprises, in combination: a cylinder closed at one end with a frangible diaphragm and closed at the other end with a closure member, the pressure of said fluid on the exterior of said diaphragm being substantially greater than the pressure within said cylinder; a piston within said cylinder; a frangible container for tracer material mounted on one end of a rod operatively connected to said piston at its other end; a striking surface supported in close proximity to said container; and means for fracturing said diaphragm thereby permitting said fluid pressure to enter said cylinder, move said piston, cause said container to strike said surface, fracture, and release said tracer material.

2. Apparatus for releasing a tracer material into a well bore fluid as a substantially compact region of high tracer material concentration, which comprises, in combination: a cylinder closed at one end with a frangible diaphragm and closed at the other end with a closure member; the pressure of said fluid on the exterior of said diaphragm being substantially greater than the pressure within said cylinder; a piston positioned within said cylinder; a piston rod attached at one end to said piston and the other end extending slidably through said closure member; a frangible container for said tracer material attached to said other end of said piston rod; a striking surface attached to said closure member and supported in close proximity to said container; and means for fracturing said diaphragm to permit said fluid to enter said cylinder, causing said piston to be actuated, said container to strike said surface and fracture, and said tracer material to be released.

3. Apparatus for releasing a tracer material into a bore hole fluid as a substantially compact region of high tracer material concentration which comprises, in combination: a cylinder block; a cylinder within said cylinder block, a frangible diaphragm closing one end and a closure member closing the other end of said cylinder, the pressure of said fluid on the exterior of said diaphragm being substantially greater than the pressure within said cylinder; a piston positioned within said cylinder; a piston rod attached at one end to said piston, the other end extending slidably through a passage in said closure member; a frangible container for said tracer material; means for attaching said container to said other end of said piston rod and adapted to maintain said tracer material in said container under substantially the same pressure as said bore hole fluid; a striking surface; means for supporting said striking surface in close proximity to said container; and means for fracturing said frangible diaphragm whereby said fluid enters said cylinder and said piston is actuated responsive to pressure differential between said fluid pressure and said pressure within said cylinder, said container is broken against said striking surface, and said tracer material is released.

4. Apparatus for releasing a tracer material into a bore hole fluid as a substantially compact region of high tracer material concentration which comprises, in combination: a breech block; a chamber within said breech block, said chamber being filled with an explosive charge; a barrel attached to one end of said breech block; a cylinder block attached to one end of said barrel; a cylinder within said cylinder block; a frangible diaphragm closing one end and a closure member closing the other end of said cylinder, the pressure of said bore hole fluid on the exterior of said diaphragm being substantially greater than the pressure within said cylinder; a piston positioned within said cylinder; a piston rod attached at one end to said piston, the other end extending slidably through a passage in said closure member; a frangible container for said tracer material; means for attaching said container to said other end of said piston rod; a striking surface; means for supporting said striking surface in close proximity to said container; means for detonating said explosive charge; means positioned within said barrel for fracturing said diaphragm responsive to the detonation of said explosive charge; and a passageway in said barrel for permitting said fluid to enter said cylinder through said fractured diaphragm and actuate said piston, causing said container to be broken against said striking surface and release said tracer material.

5. The combination of claim 3 comprising, in addition: a cap attached to said breech block; means including a cable attached to said cap and a winch at the surface for raising and lowering said apparatus within said bore hole; and wherein said means for attaching said container to said piston rod comprises: an adapter attached at one end to said rod, the other end of said adapter being threaded internally; a bolt threaded into said internal threads of said adapter; and a resilient packing member mounted between the head of said bolt and the end of said adapter, said packing member being capable of expansion laterally upon being compressed longitudinally and adapted to frictionally engage said frangible container.

6. Apparatus for detecting leaks of fluid from well bores which comprises, in combination: an elongated housing adapted to be lowered into a bore hole; a radiation detector mounted within said housing for detecting radiation emitted by a radioactive tracer material released as described hereinafter; a chamber formed within said housing, spaced apart from, and below said radiation detector; an explosive charge within said chamber; a cylinder secured to said housing adjacent to, spaced apart from, and below said chamber; a frangible diaphragm closing the upper end of said cylinder and a closure member closing the lower end of said cylinder, the pressure of said bore hole fluid on the exterior of said diaphragm being substantially greater than the pressure within said cylinder; a piston positioned within said cylinder; a piston rod attached at one end to said piston and the other end extending slidably through said closure member; means for attaching a frangible container for a radioactive tracer material to said other end of said piston rod and maintaining said tracer material in said container under substantially bore hole fluid pressure; a striking surface attached to said closure member and supported in close proximity to said container; and means positioned between said chamber and said diaphragm for fracturing said diaphragm responsive to detonation of said explosive charge thereby actuating said piston, causing said container to be forced against said striking surface, fracture, and release said tracer material into said bore hole fluid below said radiation detector as a substantially compact region of high tracer material concentration.

7. Detecting apparatus for detecting leaks of bore hole fluid from a bore hole comprising, in combination: an elongated housing adapted to be lowered into a bore hole; a Geiger tube mounted in said housing; a single shot multivibrator circuit mounted in said housing and connected to the anode of said Geiger tube; an amplifier tube, connected as a cathode follower and mounted in said housing, for amplifying pulses from said multivibrator; an A.C. power source at the surface of said bore hole for supplying operating potentials to said Geiger tube, said amplifier tube and said multivibrator; and circuit means connecting the output of said amplifying tube to counting means at said surface for measuring the pulses transmitted by said amplifying tube over said circuit means.

8. Detecting apparatus for detecting leaks of bore hole fluid from a bore hole; comprising in combination: an elongated housing adapted to be lowered into a bore hole; a Geiger tube mounted in said housing; a single shot multivibrator circuit mounted in said housing and connected to the anode of said Geiger tube; a first power supply means for said Geiger tube, said first power supply means comprising a transformer, a rectifier tube and a voltage regulator tube, all mounted within said housing; a second power supply means for said multivibrator circuit, said second power supply means comprising three rectifier tubes and three condensers forming a voltage tripler mounted within said housing; a primary source of A.C. power at the surface of said bore hole for supplying power to both of said first and said second power supply means; an amplifier tube, connected as a cathode follower, for amplifying pulses from said multivibrator; a lead for transmitting the output of said amplifier tube to a counting means at the surface of said bore hole for counting the pulses from said amplifier tube; a firing circuit, having said lead as a part thereof, for ignition of a powder charge in a chamber formed in said housing apart from and below said Geiger tube; a rectifier in said firing circuit poled so as to allow only negative pulses to pass therethrough; and a second power source at said surface for said firing circuit.

9. Apparatus for detecting leaks of fluid from bore hole comprising, in combination: an elongated housing; a motivated reel positioned at the surface of said bore hole; a cable, containing a plurality of electrical leads, extending between said reel and said housing to raise and lower said housing in said bore hole; a Geiger tube mounted within said housing for detecting radiation emitted by a radioactive tracer material released from a container as described hereinafter; a single shot multivibrator mounted in said housing and connected to the anode of said Geiger tube; an amplifier tube, connected as a cathode follower and mounted in said housing, for amplifying pulses from said multivibrator; means to supply operating potentials to said Geiger tube and said multivibrator by means of first and second leads in said cable; a counter circuit positioned at the surface of the bore hole and connected to the output of said amplifier tube by means of a third lead in said cable; a cylinder formed in said housing apart from and below said Geiger tube, said multivibrator and said amplifier tube, said cylinder being closed at its upper end with a frangible diaphragm exposed to bore hole fluid pressure, said bore hole fluid pressure being substantially greater than the pressure within said cylinder; a piston within said cylinder; a piston rod attached at one end to said piston, the other end of said rod extending without said housing through a closure member closing the lower end of said housing; means for mounting a frangible container for a radioactive tracer material on said other end of said rod and adapted to maintain said tracer material under substantially said bore hole fluid pressure; a striking surface supported from said closure member in close proximity to said container; means within said housing for fracturing said diaphragm thereby causing said container to strike said surface, fracture, and release said tracer material into said well fluid; and a circuit, including said third lead, connecting said last mentioned means to a power source at the surface of the bore hole whereby the radioactive material in said container can be released by means positioned at the surface of the bore hole.

10. Apparatus for detecting leaks of bore hole fluid from a bore hole, which comprises, in combination: releasing means, positioned in and operatively connected to the lower portion of an elongated housing adapted to be raised and lowered in said bore hole, for releasing a radioactive tracer material at substantially borehole pressure from a frangible container, adapted to maintain said tracer material under substantially borehole pressure, into said bore hole fluid as a substantially compact region of high tracer material concentration; and a radiation detector mounted within said housing, above said releasing means, for detecting radiation emitted from said released tracer material.

11. Apparatus according to claim 10 wherein said radiation detector comprises: a Geiger tube mounted within said housing for detecting said radiation emitted from said released tracer material; a single shot multivibrator mounted in said housing and connected to the anode of said Geiger tube; an amplifier tube, connected as a cathode follower and mounted in said housing, for amplifying pulses from said multivibrator; means for supplying operating potentials to said Geiger tube, said multivibrator and said amplifier tube from a first power source at the surface of said bore hole; and a lead for transmitting the output of said amplifier tube to a counting means at the surface of said bore hole for counting the pulses from said amplifier tube; and wherein said releasing means comprises: a chamber formed within said housing, spaced apart from, and below said Geiger tube, said multivibrator and said amplifier tube; an explosive charge within said chamber; a cylinder formed in said housing, spaced apart from and below said chamber; a frangible diaphragm closing the upper end of said cylinder and exposed to bore hole fluid pressure, said bore hole fluid pressure being substantially greater than the pressure within said cylinder; a piston within said cylinder; a piston rod attached at one end to said piston, the other end of said rod extending without said housing through a closure member closing the lower end of said housing; means for mounting said frangible container containing said tracer material on said extended other end of said rod and adapted to maintain said tracer material under substantially said bore hole fluid pressure; a striking surface supported from said closure member in close proximity to said container; means positioned between said chamber and said diaphragm for fracturing said diaphragm responsive to detonation of said explosive charge, thereby actuating said piston, causing said container to be forced against said striking surface, fracture, and release said tracer material into said bore hole fluid; a firing circuit, having said lead as a part thereof, for ignition of said explosive charge; a rectifier in said firing circuit poled so as to allow only negative pulses to pass therethrough; and a second power source at the surface of said bore hole connected to said firing circuit.

12. In apparatus for detecting leaks of fluid from a borehole, said apparatus comprising an assembly of a radiation detector with a mechanism for releasing a radioactive tracer material, the improvement of: an elongated housing adapted to be lowered into a borehole; a radiation detector mounted within said housing for detecting radiation emitted by a radioactive tracer material released as described hereinafter; a chamber formed within said housing, spaced apart from, and below said radiation detector; an explosive charge within said chamber; a cylinder secured to said housing adjacent to, spaced apart from, and below said chamber; a frangible diaphragm closing the upper end of said cylinder and a closure member closing the lower end of said cylinder, the pressure of said borehole fluid on the exterior of said diaphragm being substantially greater than the pressure within said cylinder; a piston positioned within said cylinder; a piston rod attached at one end to said piston and the other end extending slidably through said closure member; means for attaching a frangible container for a radioactive tracer material to said other end of said piston rod and maintaining said tracer material in said container under substantially borehole fluid pressure; a striking surface attaching to said closure member and supported in close proximity to said container; and means positioned between said chamber and said diaphragm for fracturing said diaphragm responsive to detonation of said explosive charge thereby actuating said piston, causing said container to be forced against said striking surface, fracture, and release said tracer material into said borehole fluid below said radiation detector as a substantially compact region of high tracer material concentration.

References Cited in the file of this patent

UNITED STATES PATENTS

| | | |
|---|---|---|
| 2,303,688 | Fearon | Dec. 1, 1942 |
| 2,385,378 | Piety | Sept. 25, 1945 |
| 2,453,456 | Piety | Nov. 9, 1948 |
| 2,700,734 | Egan et al. | Jan. 25, 1955 |
| 2,725,940 | Shidell et al. | Dec. 6, 1955 |
| 2,740,478 | Greene | Apr. 3, 1956 |
| 2,776,378 | Youmans | Jan. 1, 1957 |

OTHER REFERENCES

Electrical Engineers' Handbook, Pender-McIlwaine, Third Edition, Sec. 7, p. 126, published by Wiley & Sons, Inc., New York, N.Y., 1936.

AEC Document No. 2064, Multivibrator Quenching of Geiger-Muller Tubes," by Thamer and Voight, published by U.S. Atomic Energy Commission.